United States Patent

Kaetsu et al.

[11] 4,311,732
[45] Jan. 19, 1982

[54] PRIMER COMPOSITION AND A PROCESS FOR PRODUCING A COATED PRODUCT USING THE SAME

[75] Inventors: Isao Kaetsu; Minoru Kumakura; Masaru Yoshida, all of Takasaki; Goro Shimaoka, Sakai; Masanobu Urabe, Tokyo, all of Japan

[73] Assignees: Mitsubishi Gas Chemical Company Inc.; Japan Atomic Energy Research Institute, both of Japan

[21] Appl. No.: 45,854

[22] Filed: Jun. 5, 1979

[30] Foreign Application Priority Data

Jun. 6, 1978 [JP] Japan .................................. 53-67916

[51] Int. Cl.³ ............................................. B32B 27/00
[52] U.S. Cl. ...................................... 427/164; 428/412
[58] Field of Search ...................... 427/164, 386, 387; 428/412

[56] References Cited

U.S. PATENT DOCUMENTS

| | | | |
|---|---|---|---|
| 3,057,746 | 10/1962 | Edmonds | 427/386 |
| 3,111,420 | 11/1963 | Boenig | 428/412 |
| 3,510,339 | 5/1970 | Wile | 427/386 |
| 3,721,598 | 3/1973 | Marcey | 427/386 |
| 3,878,132 | 4/1975 | Bertram | 427/386 |
| 4,073,967 | 2/1978 | Sandvig | 428/412 |
| 4,121,014 | 10/1978 | Shaffer | 428/412 |

*Primary Examiner*—Sam Silverberg
*Attorney, Agent, or Firm*—Browdy and Neimark

[57] ABSTRACT

In accordance with this invention, there is provided a primer composition prepared by dissolving in an organic solvent at least one diepoxy compound selected from the group consisting of:

(1) polyalkylene glycol diglycidyl ether of the formula;

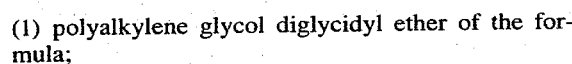

(2) poly(alkylene glycol)diglycidyl ether of the formula;

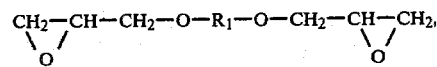
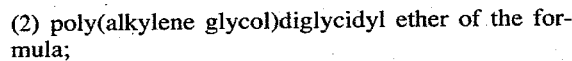

and (3) diepoxide derived from a bisphenol of the formula;

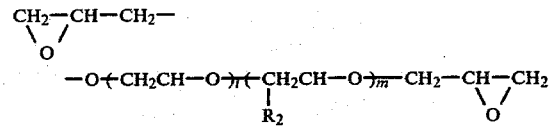

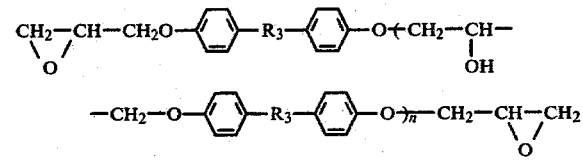

(wherein $R_1$ is a linear or branched alkylene group having less than 8 carbon atoms; $R_2$ is a linear or branched alkyl group having less than 4 carbon atoms, $R_3$ is a linear or branched alkylene group having less than 8 carbon atoms, or a binding group selected from the class consisting of

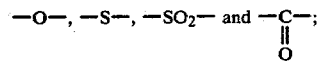

l, m and n are each an integer of from 0 to less than 10, the sum of l and m being more than 1).

Also in accordance with the invention, there is provided a process for producing a coated product using such primer composition.

5 Claims, No Drawings

PRIMER COMPOSITION AND A PROCESS FOR PRODUCING A COATED PRODUCT USING THE SAME

BACKGROUND OF THE INVENTION

1. Field of the Invention

This invention relates to a primer composition which provides the surface of a plastics substrate with a top-coating having high wear resistance, surface hardness, heat resistance and chemical resistance as well as to a process for producing a coated product characterized by using such primer composition. More particularly, this invention relates to a primer composition comprising a specific diepoxy compound dissolved in an organic solvent and to a process comprising coating the surface of a plastics substrate with the primer composition, heating the primer-coated plastics substrate to provide a dry prime coating, and then coating a top-coating paint over the dry prime coating to thereby prepare a desired coated product.

2. Description of the Prior Art:

Of a variety of transparent plastic molded articles in current use, those molded from acrylic or methacrylic resins are lightweight, have high mechanical properties and an esthetically appealing appearance. But unfortunately, these resins are inferior to metals and other inorganic materials in respect of wear resistance, surface hardness, heat resistance and chemical resistance. A polycarbonate resin has relatively high wear resistance and surface hardness, but not so high as to withstand practical use. Therefore, many attempts have heretofore been made to improve the characteristics of the surface of acrylic resin, methacrylic resin, polycarbonate resin and other transparent plastics.

The inventors of this invention have also proposed several techniques for improving the surface hardness, wear resistance, heat resistance and chemical resistance of a transparent plastic molded article. To be more specific, as a result of studies on the coating of a silicone-containing polymer applied to a transparent plastics substrate, the present inventors have successfully prepared a series of silicone-containing thermosetting resin compositions that are capable of providing the surface of a transparent plastics substrate with a hardened film which satisfies the requirements of high wear resistance, surface hardness, heat resistance and chemical resistance, and these resin compositions are the subject of pending Japanese patent applications.

However, the coating of these silicone-containing resin compositions does not always adhere strongly to the treated plastics substrate. For instance, a polycarbonate resin or polymethyl methacrylate resin is easily attacked by a monomer or a solvent and turns cloudy upon contact with a coating agent that contains such monomer or solvent. A polymethyl methacrylate resin as well as polycarbonate resin has low affinity for a vinyl compound and silicone compound; hence only low adhesive bond strength is obtained between the plastics substrate and the coating. It is, therefore, necessary that some plastics substrate be treated with a primer to form a prime coating before they are given the final coating.

SUMMARY OF THE INVENTION

It is, therefore, one object of this invention to provide a primer suitable for a prime coating on a transparent plastics substrate.

It is another object of this invention to provide a process for using such primer to prepare a desired coated product.

To meet such need, the present inventors have prepared a primer composition by dissolving in an organic solvent a diepoxy compound of the type described hereunder, and have found that a product prepared by coating a plastics substrate with the primer, drying under heat and thereafter coating the same with a top-coating paint is resistant to a solvent and provides a strong bond between the substrate and the top-coating.

DETAILED DESCRIPTION OF THE INVENTION

The primer composition of this invention is prepared by dissolving in an organic solvent at least one diepoxy compound selected from the group consisting of (1) polyalkylene glycol diglycidyl ether of the formula:

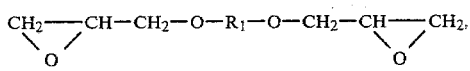

(2) poly(alkylene glycol)diglycidyl ether of the formula:

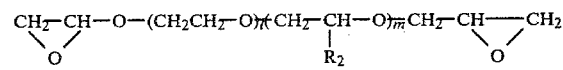

and (3) diepoxide derived from a bisphenol of the formula:

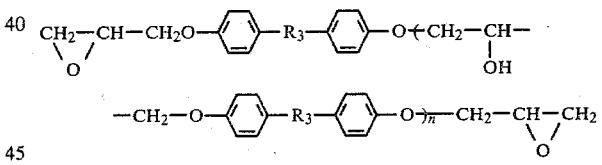

(wherein $R_1$ is a linear or branched alkylene group having less than 8 carbon atoms; $R_2$ is a linear or branched alkyl group having less than 4 carbon atoms; $R_3$ is a linear or branched alkylene group having less than 8 carbon atoms or a binding group selected from the class consisting of

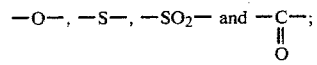

l, m and n are each an integer of from 0 to less than 10, the sum of l and m being more than 1).

Typical examples of the polyalkylene glycol diglycidyl ether of the formula (1) are ethylene glycol diglycidyl ether, propylene glycol diglycidyl ether, neopentyl glycol diglycidyl ehter, hexamethylene glycol diglycidyl ether, etc. Examples of the poly(alkylene glycol)diglycidyl ether of the formula (2) are compounds obtained by glycidyl-etherizing of both terminal hydroxy groups of poly(ethylene glycol), poly(propylene glycol) and poly(ethylene glycol/propylene glycol) prepared by copolymerizing ethylene oxide and propylene oxide. By the term "diepoxide" of the formula (3) is meant what is generally known as an epoxy resin prepared by reacting a bisphenol typified by bisphenol A with epihalohydrin.

The primer composition of this invention is prepared by dissolving 0.1 to 50 parts by weight of such diepoxy compound in 100 parts by weight of an organic solvent. While there is no particular limitation on the type of the organic solvent, preferred examples are lower alcohols exemplified by methanol and ethanol; ethers illustrated by a ethylene glycol mono alkyl ether (for example, methyl Cellosolve, ethyl Cellosolve, butyl Cellosolve), p-dioxane and tetrahydrofuran; ketones such as acetone. There may be preferably used hydrophilic organic solvents.

The primer composition of this invention can be applied to a plastics substrate by brushing, spraying, immersion and other suitable conventional techniques. While the plastics base material may be transparent, translucent or opaque, a transparent plastics substrate, especially a polycarbonate or polymethyl methacrylate resin, is preferred since the prime coating composed of the primer composition of this invention is transparent.

The substrate coated with the primer composition of this invention may be dried at a temperature within the range of from 30° to 200° C., preferably from 100° to 150° C. Heating for a period in the range of from one to 60 minutes is sufficient to cure the primer and provide a desired prime coating.

There is no particular limitation on the type of top-coating which is to be applied to the primer-coated plastics substrate, and any conventional type of curable acrylic paint may be employed. But the primer composition of this invention will work most effectively if the top-coating is made of a curable silane compound containing paint which is known to form a practical top-coating providing high surface hardness, wear resistance and chemical resistance. Therefore, by first coating a plastics base material with the primer composition of this invention, drying the primer-coated base with heat, coating then the primer treated base with a thermosetting silane paint and curing the paint under heat, the surface of the plastic substrate can be provided with a film of coating having high surface hardness and other desired properties. The resulting film is very strongly bonded to the base material. The term "thermosetting silane paint" used herein means a paint containing as an effective ingredient, one or more carbon functional silane compounds illustrated by an epoxy group containing silane compound, vinyl group containing silane compound and amino group containing silane compound, a mixture of carbon functional silane compounds with an organoxysilane compound or orthosilicate compound, a mixture of partial hydrolyzates of such carbon functional silane compounds, or a co-hydrolyzate of the mixture of carbon functional silane compound with organoxysilane compound or orthosilicate compound. Upon heating, these effective ingredients are cured to provide a film coating having high wear resistance, surface hardness, chemical resistance and electrical properties.

As described hereinabove, the present invention provides a primer composition used to improve a bond strength of a surface coating to a plastics substrate. It is to be understood that addition of a fluoride surfactant to the primer composition provides a more homogeneous coat. The fluoride surfactant is commercially available as a product of Minesota Mining and Manufacturing Co., a trade name "Fluorad", which is said to contain a perfluorocarbon and for example to be composed of a copolymer of perfluoroalkyl acrylate and polyethylene acrylate.

This invention will now be described in greater detail by reference to the following Examples and Comparative Examples, wherein all "parts" are by weight unless otherwise noted. The following methods were used to evaluate the performance of hardened films prepared in the Examples and Comparative Examples.

SCRATCH RESISTANCE

A #0000 steel wool was used to rub the film coating lightly back and forth. With one cycle consisting of rubbing back and forth, 15 cycles of rubbing were performed. The following four criteria on severity were used to evaluate any resulting scratch on the film.
A': No scratch
A: Less than 10 scratches
B: More than 10 scratches but the film remained lusterous
C: Many scratches resulting in loss of luster

WEAR RESISTANCE

A wear resistance test was conducted in compliance with the falling sand method as defined in ASTMD 968-51. Evaluation was performed in terms of percent wear resistance which was the ratio of light transmittance of a worn film to that of a new film. The following are the values of percent wear resistance of three base materials as determined by this method.

| | |
|---|---|
| Inorganic glass | 5.5% |
| CR39 (poly(diethylene glycol bis-alkylcarbonate)) | 25.3% |
| Acrylic resin (methyl methacrylate polymer) | 67.8% |

ADHESION TO BASE MATERIAL

A checkered pattern peel test was conducted wherein a razor was used to form a hundred of 1 mm² squares cut in the film to the depth of the base material, a cellophane tape was applied to the film, the tape was quickly torn off from the film to provide an angle of 90 degrees between the tape and film, and the number of squares of the film left intact with counted. No lost squares is indicated by the symbol 100/100 in the table below.

COMPARATIVE EXAMPLE 1

A mixture of one part of γ-glycidoxypropyl trimethoxysilane, one part of monomethyl trimethoxysilane, one part of tetramethyl orthosilicate, 3 parts of ethanol, 0.5 parts of water and 0.01 part of perchloric acid was subjected to hydrolysis at 70° C. for a period of one hour. The resulting composition was directly applied to a polycarbonate substrate which was then cured by heating at 110° C. for a period of 2 hours. The performance of the hardened film is set forth in the table below.

COMPARATIVE EXAMPLE 2

A mixture of one part of γ-glycidoxypropyl trimethoxysilane, one part of tetramethyl orthosilicate, 3 parts of ethanol, 0.5 parts of water, and 0.01 part of perchloric acid was subjected to hydrolysis at 70° C. for a period of one hour. The resulting composition was directly applied to a polymethyl methacrylate substrate which was then cured at 100° C. for a period of 2 hours. The performance of the hardened film is set forth in the table below.

EXAMPLE 1

A polycarbonate substrate (a product of MITSUBISHI GAS CHEMICAL COMPANY, INC., a trade name "IUPILON E-2000") was immersed in a 2% solution of 2,2-bis(4'-glycidyl oxyphenyl) propane in ethyl Cellosolve (the solution containing 0.05% of a fluoride surfactant (a trade name "Fluorad FC-400", produced by Minnesota Mining and Manufacturing Co.) and heated at 110° C. for a period of 5 minutes to form a film coating on both surfaces of the substrate. The film was coated with a top-coating composition prepared under the same conditions as Comparative Example 1, and cured at 110° C. for a period of 2 hours. The performance of the hardened film is set forth in the table below.

EXAMPLE 2

A polymethyl methacrylate substrate (a product of MITSUBISHI RAYON COMPANY, LTD., a tradename "ACRYLITE") was immersed in a 10% solution of 2,2-bis(4'-glycidyl oxyphenyl) propane in ethyl Cellosolve (the solution containing 0.05% of a fluoride surfactant (a trade name "Fluorad FC-430", produced by Minesota Mining and Manufacturing Co.) and heated at 100° C. for a period of 10 minutes to form a film coating on both surfaces of the substrate. The resulting film was coated with a top-coating composition prepared under the same conditions as Comparative Example 1, and cured at 100° C. for a period of 2 hours. The performance of the hardened film is set forth in the table below.

EXAMPLE 3

A polycarbonate substrate used in Example 1 was immersed in a 5% solution of diglycidyl ether of polyethyleneglycol having a degree of polymerization of 9 in ethanol, and heated at 100° C. for a period of 5 minutes to form a film coating on both surfaces of the substrate. The film was coated with a top-coating composition prepared under the same conditions as Comparative Example 2, and cured at 110° C. for a period of 2 hours. The performance of the hardened film is set forth in the table below.

What is claimed is:

1. A process of preparing a polycarbonate product coated with a film having desired characteristics which comprises
    coating a polycarbonate substrate with a primer composition for providing the polycarbonate substrate with a top-coating, which primer is prepared by dissolving at least one diepoxy compound selected from the group consisting of diepoxides derived from a biphenol of the formula:

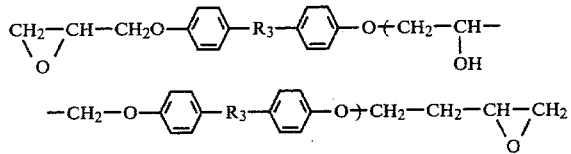

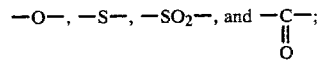

wherein $R_3$ is a linear or branched alkylene group having less than 8 carbon atoms or a binding group selected from the class consisting of $$-O-, -S-, -SO_2-, \text{ and } -\underset{\underset{O}{\|}}{C}-;$$

and n is an integer of from 1 to less than 10, in an amount of 0.1 to 50 parts by weight based on an amount of 100 parts by weight of at least one organic solvent selected from the group consisting of lower alcohols, ethers and ketones,
    drying the primer-coated polycarbonate substrate to provide a dry primer coating,
    coating the dry primer-coated substrate with a top-coating paint which is a thermosetting silane paint containing as an effective ingredient, one or more carbon functional silane compounds and
    curing the paint with heat.

2. A process of claim 1 in which the diepoxy compound is the diepoxide prepared by reacting bisphenol A with epichlorohydrin.

3. A process of claim 1 in which the primer-coated polycarbonate substrate is dried at a temperature within the range of from 30° to 200° C.

4. A process of claim 1 wherein the primer-coated polycarbonate substrate is dried at 100°–150° C.

5. A process of claim 1 wherein the primer composition further comprises a fluoride surfactant.

TABLE

| Run | Transparent plastics base material | Performance of hardened film | | | |
|---|---|---|---|---|---|
| | | Appearance | Starch resistance | Percent wear resistance | Adhesive strength |
| Com. Ex. 1 | polycarbonate | colorless transparent homogeneous | A' | 9.0 | 0/100 |
| Com. Ex. 2 | polymethyl methacrylate | colorless transparent homogeneous | A' | 8.0 | 0/100 |
| Ex. 1 | polycarbonate | colorless transparent homogeneous | A' | 9.0 | 100/100 |
| Ex. 2 | polymethyl methacrylate | colorless transparent homogeneous | A' | 8.5 | 100/100 |
| Ex. 3 | polycarbonate | colorless transparent homogeneous | A' | 8.5 | 100/100 |